(12) United States Patent
Tsai et al.

(10) Patent No.: US 10,170,987 B2
(45) Date of Patent: Jan. 1, 2019

(54) CONTROL CIRCUIT OF POWER CONVERTER WITH INTERNAL SIGNAL GENERATOR AND RELATED METHOD

(71) Applicant: RICHTEK TECHNOLOGY CORPORATION, Hsinchu (TW)

(72) Inventors: Yu-Nung Tsai, New Taipei (TW); Yi-Chun Chen, Taoyuan (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 112 days.

(21) Appl. No.: 15/388,923

(22) Filed: Dec. 22, 2016

(65) Prior Publication Data

US 2017/0104412 A1    Apr. 13, 2017

Related U.S. Application Data

(63) Continuation-in-part of application No. 14/668,290, filed on Mar. 25, 2015, now Pat. No. 9,563,212.

(30) Foreign Application Priority Data

Sep. 10, 2014    (TW) .............................. 103131140 A (51) Int. Cl.
| | | |
|---|---|---|
| H02M 3/158 | (2006.01) | |
| H02M 3/157 | (2006.01) | |
| G05F 1/46 | (2006.01) | |
| H02M 1/00 | (2006.01) | |
| H02M 1/44 | (2007.01) | |

(52) U.S. Cl.
CPC .............. *H02M 3/157* (2013.01); *G05F 1/46* (2013.01); *H02M 3/1588* (2013.01); *H02M 1/44* (2013.01); *H02M 2001/0012* (2013.01); *Y02B 70/1466* (2013.01)

(58) Field of Classification Search
None
See application file for complete search history.

(56) References Cited

U.S. PATENT DOCUMENTS

| | | | |
|---|---|---|---|
| 6,583,610 B2 * | 6/2003 | Groom .................. | H02M 3/156 323/224 |
| 7,595,624 B2 | 9/2009 | Tateishi et al. | |

(Continued)

*Primary Examiner* — Jeffrey A Gblende
(74) *Attorney, Agent, or Firm* — Birch, Stewart, Kolasch & Birch, LLP (57) ABSTRACT

A control circuit includes: a comparing circuit, having a first input terminal and second input terminal, configured to operably generate a comparison signal according signals received by the first and second input terminals, wherein the first input terminal is utilized for coupling with a reference signal and the second input terminal is utilized for coupling with a feedback signal; a periodic signal generating circuit configured to operably generate a periodic signal and apply the periodic signal to the first input terminal or the second input terminal of the comparing circuit; and a control signal generating circuit for controlling an on time of a power switch according to the comparison signal. The periodic signal generating circuit clamps a limit of the periodic signal to a predetermined value, but does not configure the slope of the periodic signal to be zero when there is no current passing through the inductor.

26 Claims, 9 Drawing Sheets

(56) References Cited

U.S. PATENT DOCUMENTS

2010/0264974 A1* 10/2010 Rien ................ H03K 19/00315
                                                          327/313
2012/0019225 A1    1/2012 Tsai
2014/0292300 A1   10/2014 Yan

* cited by examiner

CONTROL CIRCUIT OF POWER CONVERTER WITH INTERNAL SIGNAL GENERATOR AND RELATED METHOD

CROSS-REFERENCE TO RELATED APPLICATIONS

This application is a Continuation-In-Part of and claims the benefit of priority to U.S. patent application Ser. No. 14/668,290, filed on Mar. 25, 2015; which claims the benefit of priority to Patent Application No. 103131140, filed in Taiwan on Sep. 10, 2014; the entirety of which is incorporated herein by reference for all purposes.

BACKGROUND

The disclosure generally relates to a power converter and, more particularly, to a control circuit and related method for improving the stability of the output signal of the power converter.

In a conventional power converter, a feedback circuit is employed to generate a feedback signal corresponding to the magnitude of an output signal of the power converter. A control circuit of the power converter typically utilizes a comparing circuit to compare the feedback signal with a reference signal to generate a comparison signal. A control signal generating circuit of the control circuit generates the control signal (e.g., the PWM signal) for controlling the operations of the power switch based on the comparison signal.

However, in the applications where the equivalent series resistance on an output capacitor of the power converter is small or the voltage-dividing ratio of the feedback circuit is small, the feedback signal generated by the feedback circuit would have a small magnitude. In this situation, noise occurring in the power converter easily causes the comparing circuit to operate erroneously and thus results in jitters in the comparison signal, thereby causing the output signal of the power converter to be unstable.

SUMMARY

An example embodiment of a control circuit of a power converter is disclosed. The power converter comprises: an inductor, a first power switch, and a feedback circuit, wherein the first power switch is utilized for controlling the inductor to store or release energy to convert an input signal into an output signal, and the feedback circuit is utilized for generating a feedback signal corresponding to a magnitude of the output signal. The control circuit comprises: a comparing circuit comprising a first input terminal and a second input terminal and configured to operably generate a comparison signal according to signals received by the first input terminal and the second input terminal, wherein the first input terminal is utilized for coupling with a reference signal while the second input terminal is utilized for coupling with the feedback signal; a periodic signal generating circuit, coupled with the comparing circuit, configured to operably generate a periodic signal and apply the periodic signal to the first input terminal or the second input terminal of the comparing circuit; and a control signal generating circuit, coupled with the comparing circuit, configured to operably control an on time of the first power switch according to the comparison signal; wherein the periodic signal generating circuit is further configured to operably clamp a limit of the periodic signal to a predetermined value, but does not configure a slope of the periodic signal to be zero when there is no current passing through the inductor.

An example embodiment of a method for controlling a first power switch of a power converter is disclosed. The power converter comprises: an inductor, the first power switch, and a feedback circuit, wherein the first power switch is utilized for controlling the inductor to store or release energy to convert an input signal into an output signal, and the feedback circuit is utilized for generating a feedback signal corresponding to a magnitude of the output signal. The method comprises: providing a comparing circuit, wherein a first input terminal of the comparing circuit is coupled with a reference signal while a second input terminal of the comparing circuit is coupled with the feedback signal; generating a periodic signal and clamping a limit of the periodic signal to a predetermined value without configuring a slope of the periodic signal to be zero when there is no current passing through the inductor; applying the periodic signal to the first input terminal or the second input terminal of the comparing circuit; utilizing the comparing circuit to generate a comparison signal according signals received by the first input terminal and the second input terminal; and controlling an on time of the first power switch according to the comparison signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
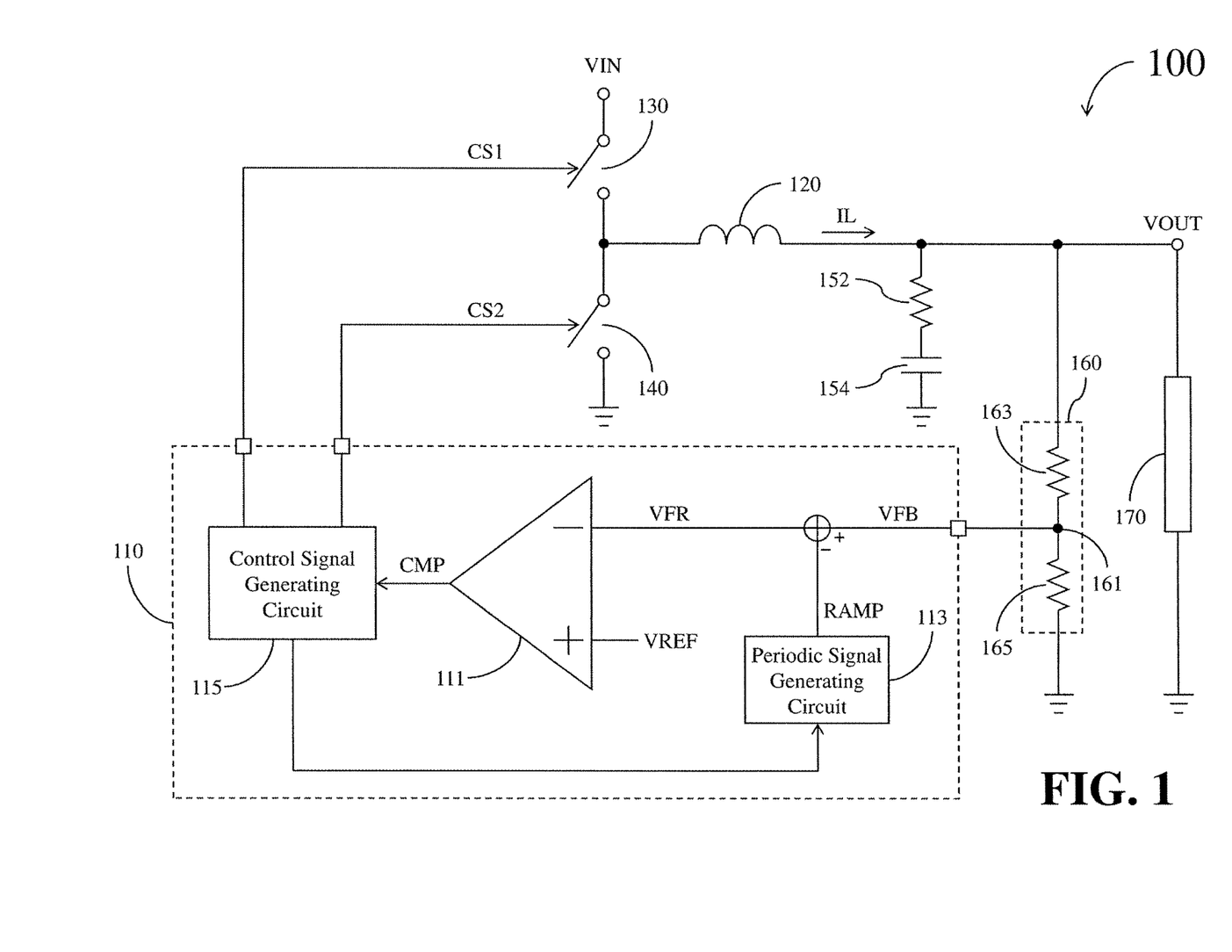
FIG. 1 shows a simplified functional block diagram of a power converter according to one embodiment of the present disclosure.

FIG. 1 shows a simplified functional block diagram of a power converter 100 according to one embodiment of the present disclosure. The power converter 100 comprises a control circuit 110, an inductor 120, one or more power switches, an equivalent series resistor 152, an output capacitor 154, and a feedback circuit 160. In the embodiment of FIG. 1, the power converter 100 comprises a first power switch 130 and a second power switch 140. As shown, the power converter 100 is a synchronous-type buck power converter.

As shown in FIG. 1, the first power switch 130 is coupled between a first terminal of the inductor 120 and an input signal VIN. The second power switch 140 is coupled between the first terminal of the inductor 120 and a fixed-voltage terminal (e.g., a ground terminal). The equivalent series resistor 152 and the output capacitor 154 are coupled between a second terminal of the inductor 120 and a load 170. The feedback circuit 160 is configured to operably generate a feedback signal VFB corresponding to the magnitude of an output signal VOUT of the power converter 100. The first power switch 130 and the second power switch 140 are utilized for controlling the inductor 120 to store or release energy to convert the input signal VIN into the output signal VOUT.

For example, the feedback circuit 160 of this embodiment comprises a feedback node 161, a first divider resistor 163, and a second divider resistor 165. The first divider resistor 163 is coupled between the second terminal of the inductor 120 and the feedback node 161. The second divider resistor 165 is coupled between the feedback node 161 and a fixed-voltage terminal (e.g., a ground terminal). After the first divider resistor 163 and the second divider resistor 165 divide the voltage of the output signal VOUT, the feedback signal VFB corresponding to the magnitude of the output signal VOUT is formed at the feedback node 161.

As shown in FIG. 1, the control circuit 110 of this embodiment comprises a comparing circuit 111, a periodic signal generating circuit 113, and a control signal generating circuit 115.

In the control circuit 110, the comparing circuit 111 comprises a first input terminal and a second input terminal. The first input terminal is utilized for coupling with a reference signal VREF while the second input terminal is utilized for coupling with the feedback signal VFB. The comparing circuit 111 is configured to operably generate a comparison signal CMP according to the signals received by the first input terminal and the second input terminal. In this embodiment, the first input terminal of the comparing circuit 111 is the non-invert terminal (+) and the second input terminal is the invert terminal (−).

The periodic signal generating circuit 113 is coupled with the comparing circuit 111, and configured to operably generate a periodic signal RAMP whose upper limit is clamped to a first predetermined value. The periodic signal generating circuit 113 is further configured to operably apply the periodic signal RAMP to the second input terminal of the comparing circuit 111, so that the signal received by the first input terminal of the comparing circuit 111 is the reference signal VREF while a signal VFR received by the second input terminal of the comparing circuit 111 is the result of the feedback signal VFB subtracted by the periodic signal RAMP.

The control signal generating circuit 115 is coupled with the comparing circuit 111, and configured to operably control the on time of the first power switch 130 and the on time of the second power switch 140 according to the comparison signal CMP.

Figure 2:
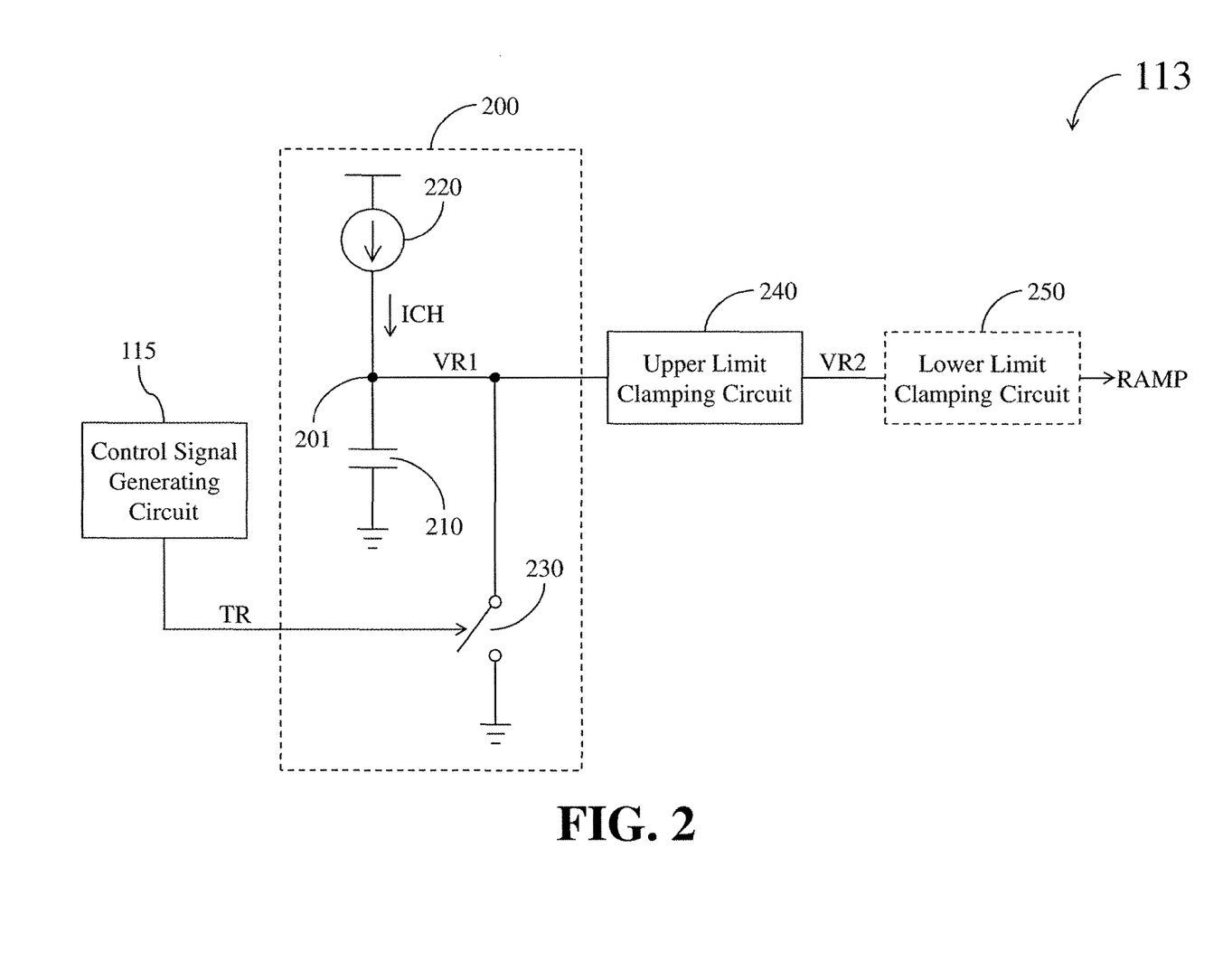
FIG. 2 shows a simplified functional block diagram of a periodic signal generating circuit in FIG. 1 according to one embodiment of the present disclosure.

Please refer to FIG. 2 which shows a simplified functional block diagram of the periodic signal generating circuit 113 in FIG. 1 according to one embodiment of the present disclosure. The periodic signal generating circuit 113 comprises an internal signal generator 200, an upper limit clamping circuit 240, and a lower limit clamping circuit 250. In the embodiment of FIG. 2, the internal signal generator 200 comprises an internal node 201, a capacitor 210, a current source 220, and a switch circuit 230.

The capacitor 210 is coupled between the internal node 201 and a fixed-voltage terminal (e.g., a ground terminal). The current source 220 is coupled with the internal node 201, and configured to operably generate and output a charging current ICH directly proportional to the switching frequency of the first power switch 130 to the internal node 201 to charge the capacitor 210, so as to render the internal node 201 to provide a first internal signal VR1. The switch circuit 230 is coupled between the internal node 201 and a fixed-voltage terminal (e.g., a ground terminal) while forms a parallel connection with the capacitor 210. The switch circuit 230 is controlled by the control signal generating circuit 115. While the first power switch 130 is turned on by the control signal generating circuit 115, the control signal generating circuit 115 first turns on the switch circuit 230 for a short period and then turns off the switch circuit 230, so as to render the magnitude of the first internal signal VR1 to drop to zero first and then gradually increases. The upper limit clamping circuit 240 is coupled with the internal node 201, and configured to operably clamp the upper limit of the first internal signal VR1 to the first predetermined value to generate a second internal signal VR2. The lower limit clamping circuit 250 is coupled with the upper limit clamping circuit 240, and configured to operably clamp the lower limit of the second internal signal VR2 to a second predetermined value smaller than the first predetermined value to form the periodic signal RAMP.

In practice, the aforementioned periodic signal RAMP may have a triangular waveform, a ramp waveform, a sine waveform, or any other adequate waveform. In addition, the positions of the upper limit clamping circuit 240 and the lower limit clamping circuit 250 may be swapped with each other.

Please note that the periodic signal generating circuit 113 utilizes the cooperation of the upper limit clamping circuit 240 and the lower limit clamping circuit 250 to restrict the boundary of the periodic signal RAMP to be between the first predetermined value and the second predetermined value, instead of adjusting the slope of the periodic signal RAMP based on an inductor current IL passing through the inductor 120. Accordingly, the periodic signal generating circuit 113 requires no detection circuit for detecting the inductor current IL of the inductor 120, and does not configure the slope of the periodic signal RAMP to be zero when there is no current passing through the inductor 120 (i.e., when the inductor current IL is zero).

In operations, the control signal generating circuit 115 may generate a first control signal CS1 for controlling the on time of the first power switch 130 and a second control signal CS2 for controlling the on time of the second power switch 140 according to the comparison signal CMP. When the control signal generating circuit 115 utilizes the first control signal CS1 to turn on the first power switch 130, the control signal generating circuit 115 utilizes the second control signal CS2 to turn off the second power switch 140. In practice, driving circuits (not shown) may be arranged between the control signal generating circuit 115 and the first power switch 130 and between the control signal generating circuit 115 and the second power switch 140 if needed.

Figure 3:
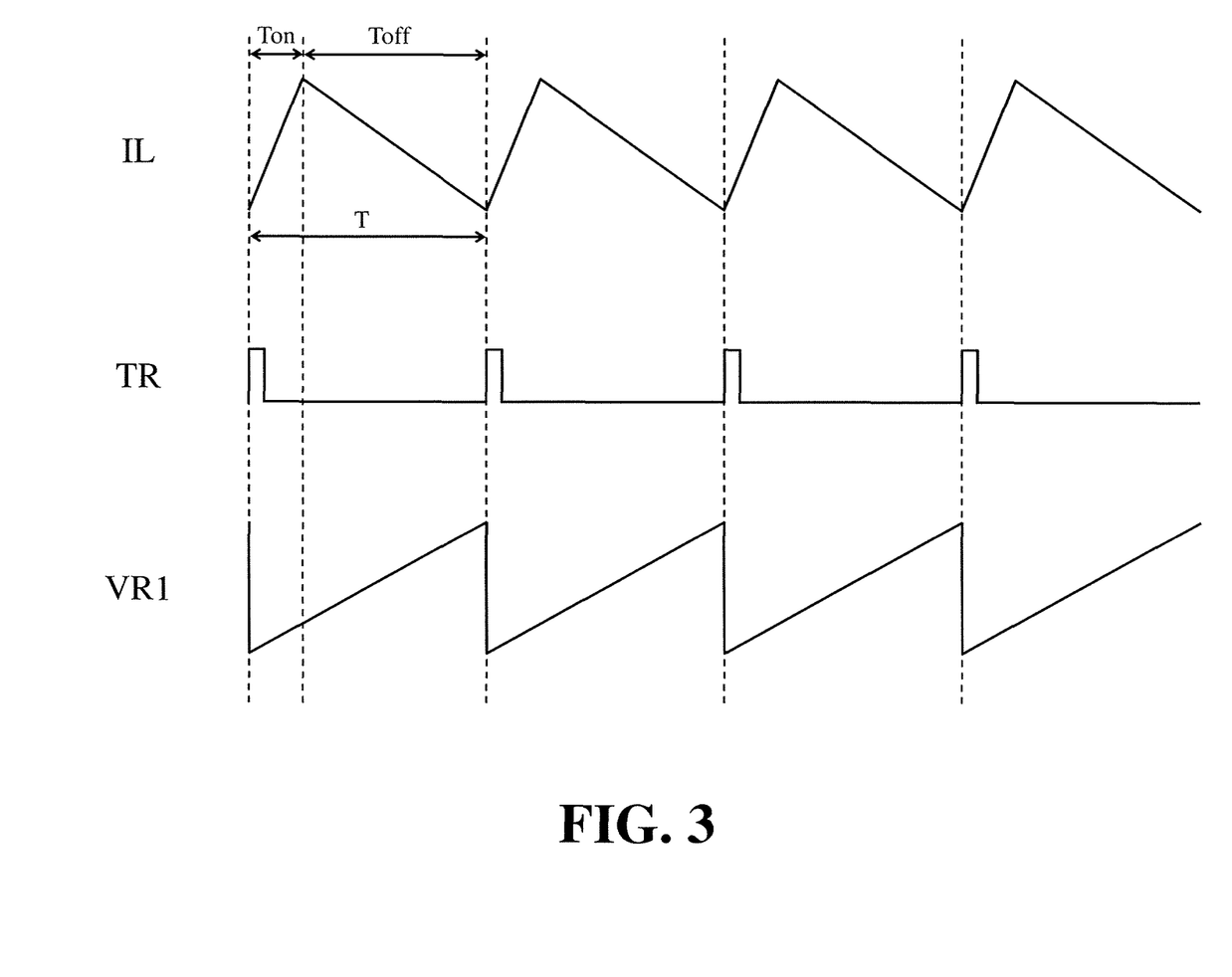
FIG. 3 shows a simplified timing diagram of an internal signal generator of FIG. 2 according to one embodiment of the present disclosure.

FIG. 3 shows a simplified timing diagram of the internal signal generator 200 according to one embodiment of the present disclosure. In FIG. 3, T denotes the time length of the varying period of the inductor current IL, Ton denotes the time length of the on time of the first power switch 130 while Toff denotes the time length of the off time of the first power switch 130. As described previously, while the control signal generating circuit 115 turns on the first power switch 130, the control signal generating circuit 115 first turns on the switch circuit 230 for a short period and then turns off the switch circuit 230. As a result, the first internal signal VR1 at the internal node 201 would be suddenly pulled down to the ground voltage and then gradually ramps up (i.e., gradually increases) to a certain level in each cycle as shown in FIG. 3. In practice, depending upon the implementation of the switch circuit 230, the control signal generating circuit 115 may trigger a pulse signal aligned with an edge of the first control signal CS1 to be a switch control signal TR for controlling the operations of the switch circuit 230, so as to align the timing of the periodic signal RAMP with the first control signal CS1. For example, in some embodiments where the first control signal CS1 is an active high signal, the control signal generating circuit 115 may trigger a pulse signal aligned with the raising edge of the first control signal CS1 to be the switch control signal TR. In some embodiments where the first control signal CS1 is an active low signal, the control signal generating circuit 115 may trigger a pulse signal aligned with the falling edge of the first control signal CSI to be the switch control signal TR.

In the embodiment of FIG. 3, the switch control signal TR is configured as an active high signal. But this is merely an embodiment, rather than a restriction to practical implementations. In practice, the switch control signal TR may be instead configured as an active low signal depending upon the implementation of the switch circuit 230.

Figure 4:
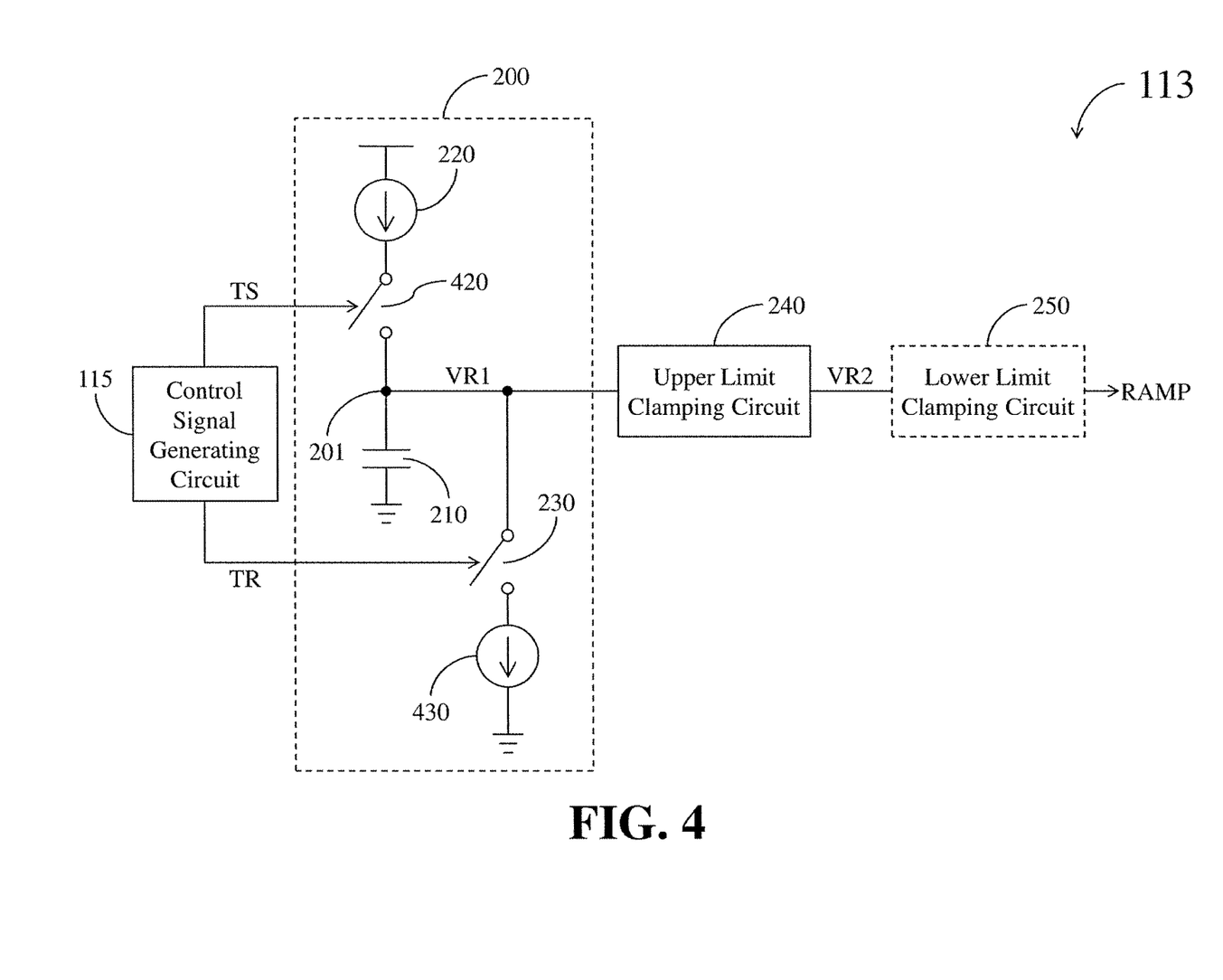
FIG. 4 shows a simplified functional block diagram of a periodic signal generating circuit in FIG. 1 according to another embodiment of the present disclosure.

FIG. 4 shows a simplified functional block diagram of the periodic signal generating circuit 113 according to another embodiment of the present disclosure. The periodic signal generating circuit 113 of FIG. 4 is similar to the embodiment of FIG. 2, but the internal signal generator 200 of FIG. 4 further comprises another switch circuit 420 and a current sink 430.

In the embodiment of FIG. 4, the switch circuit 420 is coupled between the internal node 201 and the current source 220, and controlled by the control signal generating circuit 115. The current sink 430 is coupled between the switch circuit 230 and the fixed-voltage terminal (e.g., a ground terminal), and controlled by the control signal generating circuit 115 to sink a predetermined amount of current from the internal node 201 through the switch circuit 230.

Figure 5:
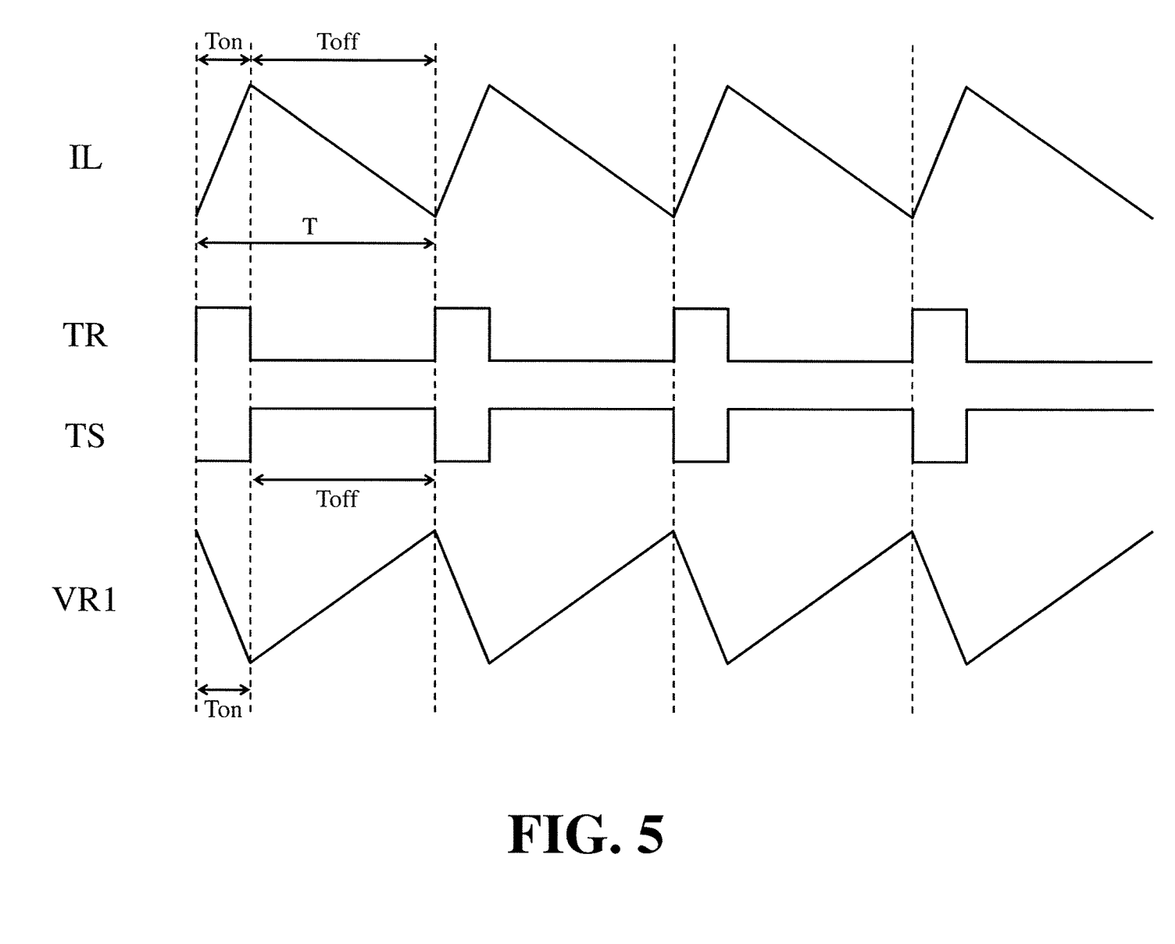
FIG. 5 shows a simplified timing diagram of an internal signal generator of FIG. 8 according to one embodiment of the present disclosure.

Please refer to FIG. 5, which shows a simplified timing diagram of the internal signal generator 200 of FIG. 4 according to one embodiment of the present disclosure. In the embodiment of FIG. 5, while the control signal generating circuit 115 turns on the first power switch 130, the control signal generating circuit 115 also utilizes a switch control signal TR to turn on the switch circuit 230 and utilizes a switch control signal TS to turn off the switch circuit 420. While the control signal generating circuit 115 turns off the first power switch 130, the control signal generating circuit 115 also utilizes a switch control signal TS to turn on the switch circuit 420 and utilizes the switch control signal TR to turn off the switch circuit 230. As a result, the first internal signal VR1 at the internal node 201 first gradually ramps down (i.e., gradually decreases) during the on time of the first power switch 130 and then gradually ramps up (i.e., gradually increases) during the off time of the first power switch 130 in each cycle as shown in FIG. 5.

For example, as shown in FIG. 5, in the case that the switch control signals TR and TS are both active high signals, the control signal generating circuit 115 may simply utilize the first control signal CS1 (or an inverted version of the second control signal CS2) to be the switch control signal TR and simply utilize the second control signal CS2 (or an inverted version of the first control signal CS1) to be the switch control signal TS.

In some embodiments where the switch control signals TR and TS are both active low signals, the control signal generating circuit 115 may utilize the second control signal CS2 (or an inverted version of the first control signal CS1) to be the switch control signal TR while utilize the first control signal CS1 (or an inverted version of the second control signal CS2) to be the switch control signal TS.

Figure 6:
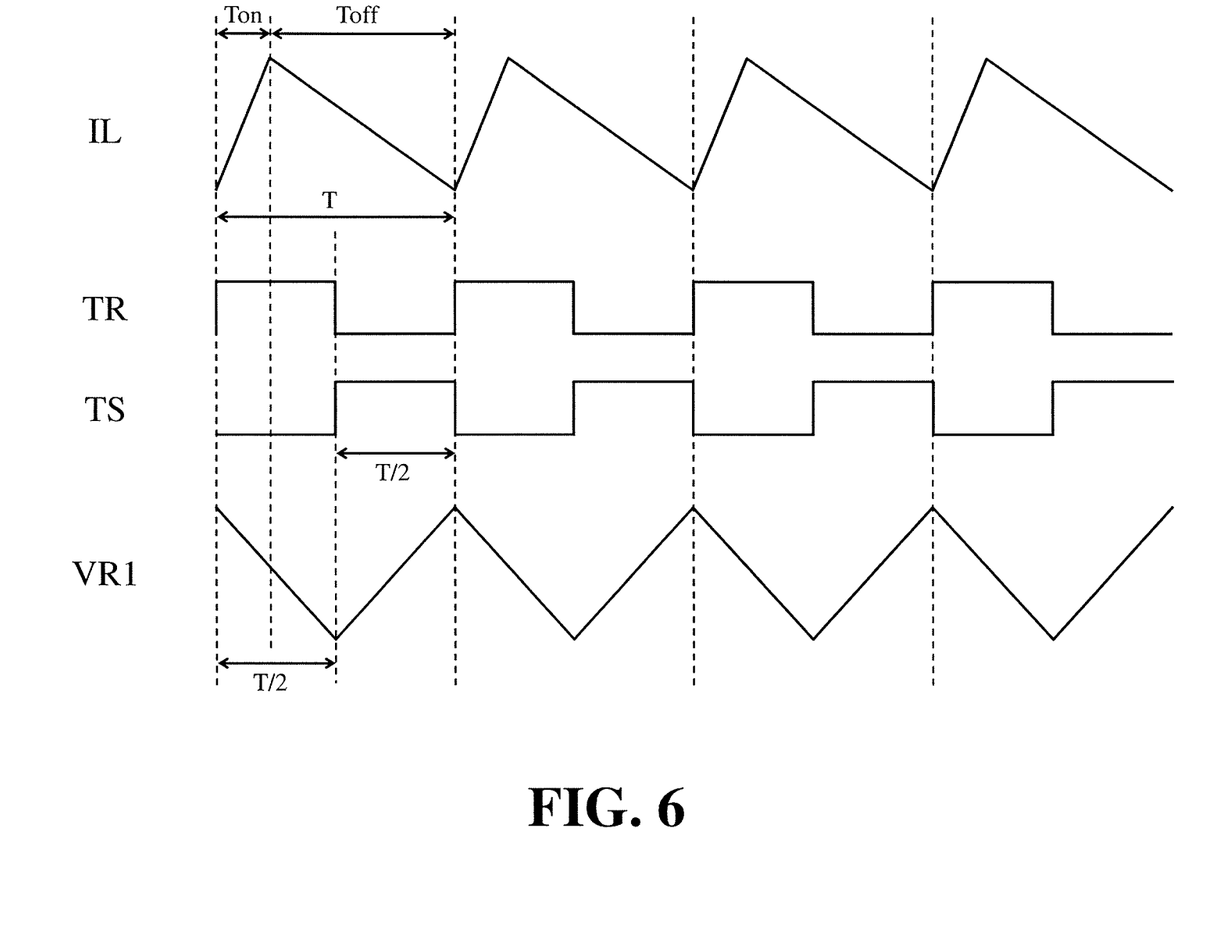
FIG. 6 shows a simplified timing diagram of an internal signal generator of FIG. 8 according to another embodiment of the present disclosure.

Please refer to FIG. 6, which shows a simplified timing diagram of the internal signal generator 200 of FIG. 4 according to another embodiment of the present disclosure. In FIG. 6, T/2 denotes the time length of a half of the varying period of the inductor current IL.

In the embodiment of FIG. 6, when the control signal generating circuit 115 turns on the first power switch 130, the control signal generating circuit 115 first turns on the switch circuit 230 and then turns off the switch circuit 230 after a time length of T/2. When the control signal generating circuit 115 turns off the switch circuit 230, the control signal generating circuit 115 first turns on the switch circuit 420 and then turns off the switch circuit 420 after a time length of T/2. As a result, the first internal signal VR1 at the internal node 201 first gradually ramps down (i.e., gradually decreases) during the first half cycle and then ramps up (i.e., gradually increases) during the second half cycle in each cycle as shown in FIG. 6.

For example, as shown in FIG. 6, in the case that the switch control signals TR and TS are both active high signals, the control signal generating circuit 115 may switch the switch control signal TR to a high-voltage level for a time length of T/2 and then switch the switch control signal TR to a low-voltage level for a time length of T/2. In addition, the control signal generating circuit 115 may utilize an inverted version of the switch control signal TR to be the switch control signal TS.

In some embodiments where the switch control signals TR and TS are both active low signals, the control signal generating circuit 115 may switch the switch control signal TR to a low-voltage level for a time length of T/2 and then switch the switch control signal TR to a high-voltage level for a time length of T/2. Similarly, the control signal generating circuit 115 may utilize an inverted version of the switch control signal TR to be the switch control signal TS.

When there is no current passing through the inductor 120 (i.e., when the inductor current IL is zero), the control signal generating circuit 115 utilizes the second control signal CS2 to turn off the second power switch 140. In this situation, the periodic signal generating circuit 113 merely utilizes the upper limit clamping circuit 240 to clamp the upper limit of the periodic signal RAMP to the aforementioned first predetermined value, but does not configure the slope of the periodic signal RAMP to be zero. As a result, the jitters in the comparison signal CMP outputted from the comparing circuit 111 can be effectively prevented, thereby improving the stability of the output signal VOUT of the power converter 100.

In addition, by utilizing the lower limit clamping circuit 250 to clamp the lower limit of the periodic signal RAMP to the aforementioned second predetermined value, the periodic signal generating circuit 113 can also improve the loop response of the power converter 100, thereby avoiding degradation on the loop response of the power converter 100 due to the use of the periodic signal generating circuit 113.

Different functional blocks of the power converter 100 may be realized with separate circuits, or may be integrated into a single circuit chip. For example, all the functional blocks of the control circuit 110 may be integrated into a single controller IC. Additionally, at least one of the first power switch 130 and the second power switch 140 may be further integrated into the control circuit 110 to form a single converter IC. In practice, the feedback circuit 160 may be further integrated into the control circuit 110.

Figure 7:
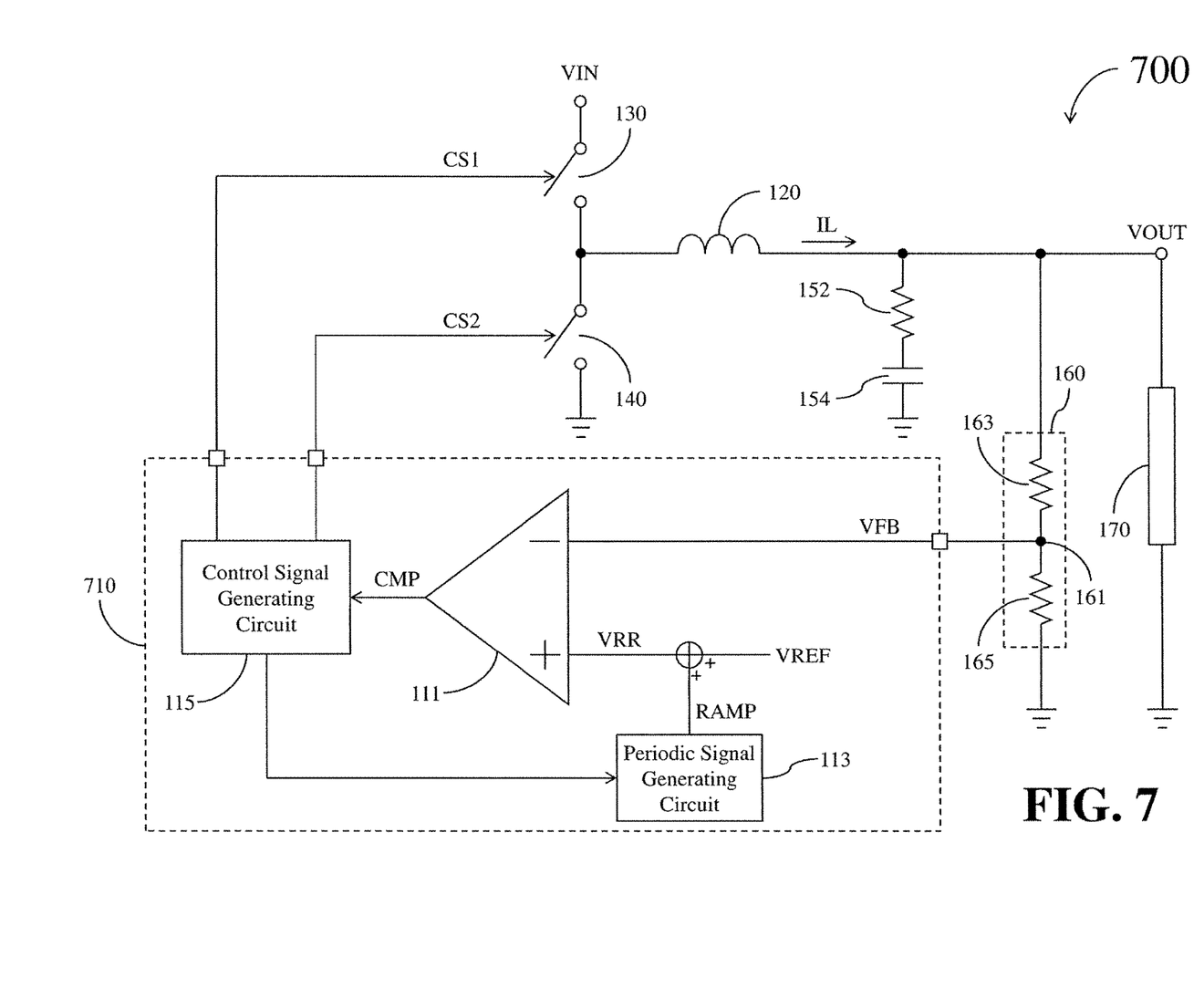
FIG. 7 shows a simplified functional block diagram of a power converter according to another embodiment of the present disclosure.

FIG. 7 shows a simplified functional block diagram of a power converter 700 according to another embodiment of the present disclosure. The power converter 700 is similar to the power converter 100 described previously. Accordingly, the foregoing descriptions regarding the connection relationships, implementations, and operations of the inductor 120, the first power switch 130, the second power switch 140, the equivalent series resistor 152, the output capacitor 154, and the feedback circuit 160 of the power converter 100 are also applicable to the corresponding components in the power converter 700. One of the differences between the power converter 700 and the power converter 100 is that the connection relationship of a control circuit 710 in the power converter 700 is different from that of the aforementioned control circuit 110.

The control circuit 710 of the power converter 700 also comprises the comparing circuit 111, the periodic signal generating circuit 113, and the control signal generating circuit 115, but the periodic signal generating circuit 113 of the control circuit 710 applies the resulting periodic signal RAMP to the first input terminal of the comparing circuit 111. As a result, a signal VRR received by the first input terminal of the comparing circuit 111 is the superposition of the reference signal VREF and the periodic signal RAMP, while the received by the second input terminal of the comparing circuit 111 is the feedback signal VFB.

The foregoing descriptions regarding the implementations, operations, and related advantages of the comparing circuit 111, the periodic signal generating circuit 113, and the control signal generating circuit 115 of the control circuit 110 are also applicable to the corresponding components in the control circuit 710. For the sake of brevity, those descriptions will not be repeated here.

Similar to the previous embodiment, when there is no current passing through the inductor 120 (i.e., when the inductor current IL is zero), the control signal generating circuit 115 utilizes the second control signal CS2 to turn off the second power switch 140. In this situation, since the periodic signal generating circuit 113 merely utilizes the upper limit clamping circuit 240 to clamp the upper limit of the periodic signal RAMP to the aforementioned first predetermined value, but does not configure the slope of the periodic signal RAMP to be zero, the jitters in the comparison signal CMP outputted from the comparing circuit 111 can be effectively prevented, thereby improving the stability of the output signal VOUT of the power converter 700.

In addition, by utilizing the lower limit clamping circuit 250 to clamp the lower limit of the periodic signal RAMP to the aforementioned second predetermined value, the periodic signal generating circuit 113 can also improve the loop response of the power converter 700, thereby avoiding degradation on the loop response of the power converter 700 due to the use of the periodic signal generating circuit 113.

Similarly, different functional blocks of the power converter 700 may be realized with separate circuits, or may be integrated into a single circuit chip. For example, all the functional blocks of the control circuit 710 may be integrated into a single controller IC. Additionally, at least one of the first power switch 130 and the second power switch 140 may be further integrated into the control circuit 710 to form a single converter IC. In practice, the feedback circuit 160 may be further integrated into the control circuit 710.

In the previous embodiment of FIG. 2 and FIG. 4, the periodic signal generating circuit 113 utilizes the cooperation of the upper limit clamping circuit 240 and the lower limit clamping circuit 250 to restrict the boundary of the periodic signal RAMP to be between the first predetermined value and the second predetermined value. But this merely an exemplary embodiment, rather than a restriction to practical implementations of the periodic signal generating circuit 113. In practice, the lower limit clamping circuit 250 of the periodic signal generating circuit 113 may be omitted while only the upper limit clamping circuit 240 is employed to clamp the upper limit of the periodic signal RAMP to the aforementioned first predetermined value, so as to simplify the circuit structure of the periodic signal generating circuit 113. In this situation, the second internal signal VR2 generated by the upper limit clamping circuit 240 may be employed to be the periodic signal RAMP.

In other embodiments, the upper limit clamping circuit 240 may be omitted while only the lower limit clamping circuit 250 is employed to clamp the lower limit of the periodic signal RAMP to the aforementioned second predetermined value, so as to simplify the circuit structure of the periodic signal generating circuit 113. In this situation, a signal generated by the lower limit clamping circuit 250 by clamping the first internal signal VR1 may be employed to be the periodic signal RAMP.

Additionally, in some embodiments, the second power switch 140 in the aforementioned power converter 100 or 700 may be replaced by a diode. That is, the disclosed control circuits 110 and 710 are also applicable to asynchronous-type power converters. In this situation, the control circuit 110 or 710 needs not to output the second control signal CS2, and thus the corresponding signal pin can be omitted.

In the foregoing elaborations, the control circuits 110 and 710 are utilized in buck power converters, but this is merely for illustrative purpose, rather than a restriction to the practical applications of the control circuits 110 and 710. In practice, the control circuit 110 or 710 described previously is also applicable to boost power converters.

Figure 8:
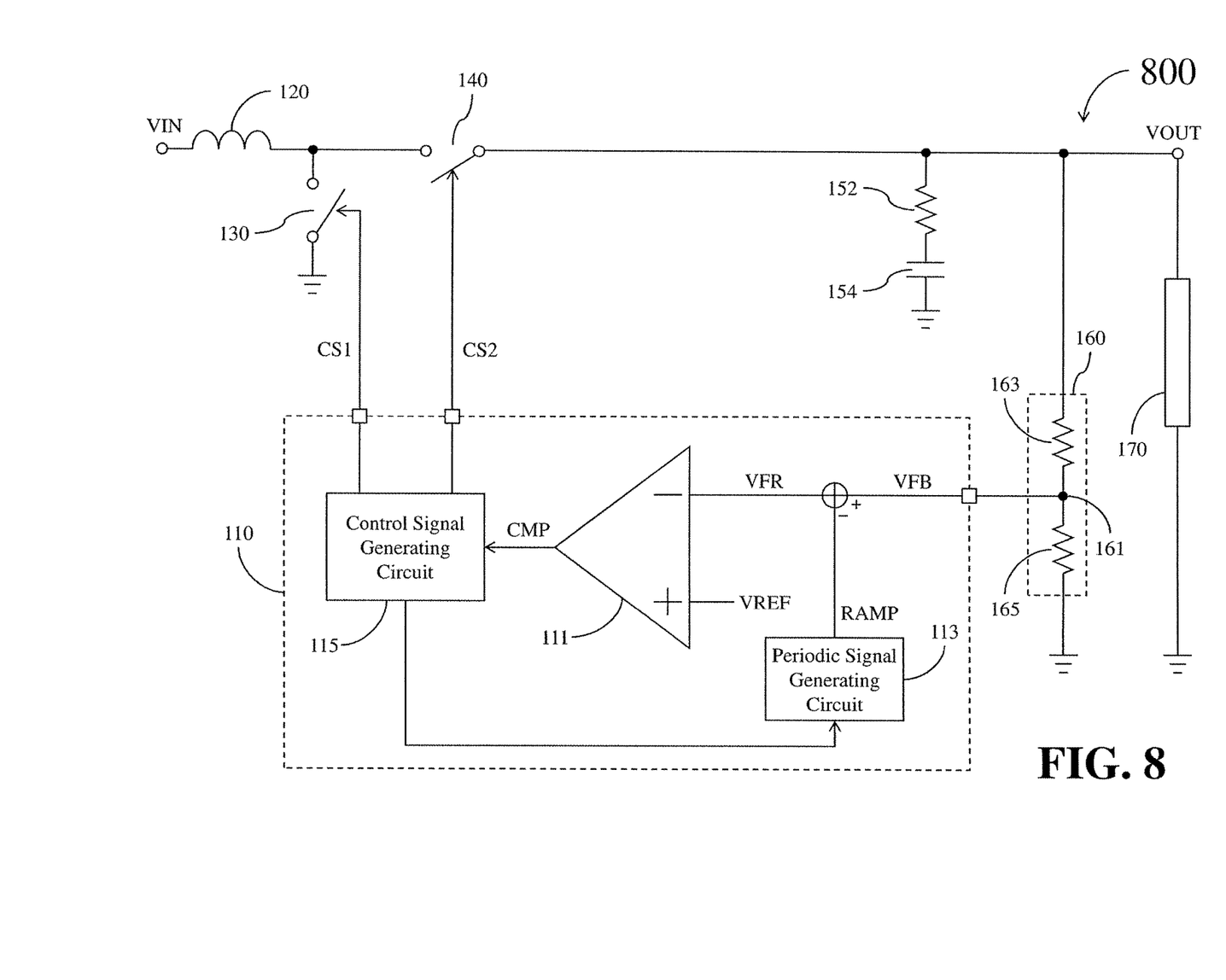
FIG. 8 and FIG. 9 show simplified functional block diagrams of power converters according to different embodiments of the present disclosure.

For example, FIG. 8 shows a simplified functional block diagram of a power converter 800 according to another embodiment of the present disclosure. The power converter 800 comprises the control circuit 110, the inductor 120, the first power switch 130, the second power switch 140, the equivalent series resistor 152, the output capacitor 154, and the feedback circuit 160. As shown, the power converter 800 is a synchronous-type boost power converter.

In the embodiment of FIG. 8, the first terminal of the inductor 120 is coupled with the input signal VIN. The first power switch 130 is coupled between the second terminal of the inductor 120 and a fixed-voltage terminal (e.g., a ground terminal). The second power switch 140 is coupled between the second terminal of the inductor 120 and the load 170. The equivalent series resistor 152 and the output capacitor 154 are coupled between the second terminal of the inductor 120 and the load 170. The feedback circuit 160 is utilized for generating the feedback signal VFB corresponding to the magnitude of the output signal VOUT of the power converter 800. The first power switch 130 and the second power switch 140 are utilized for controlling the inductor 120 to store or release energy to convert the input signal VIN into the output signal VOUT.

The structure of the control circuit 110 of the power converter 800 is the same as the control circuit 110 in FIG. 1, and thus the foregoing descriptions regarding the implementations and operations of the control circuit 110 in FIG. 1 are also applicable to the embodiment of FIG. 8.

Figure 9:
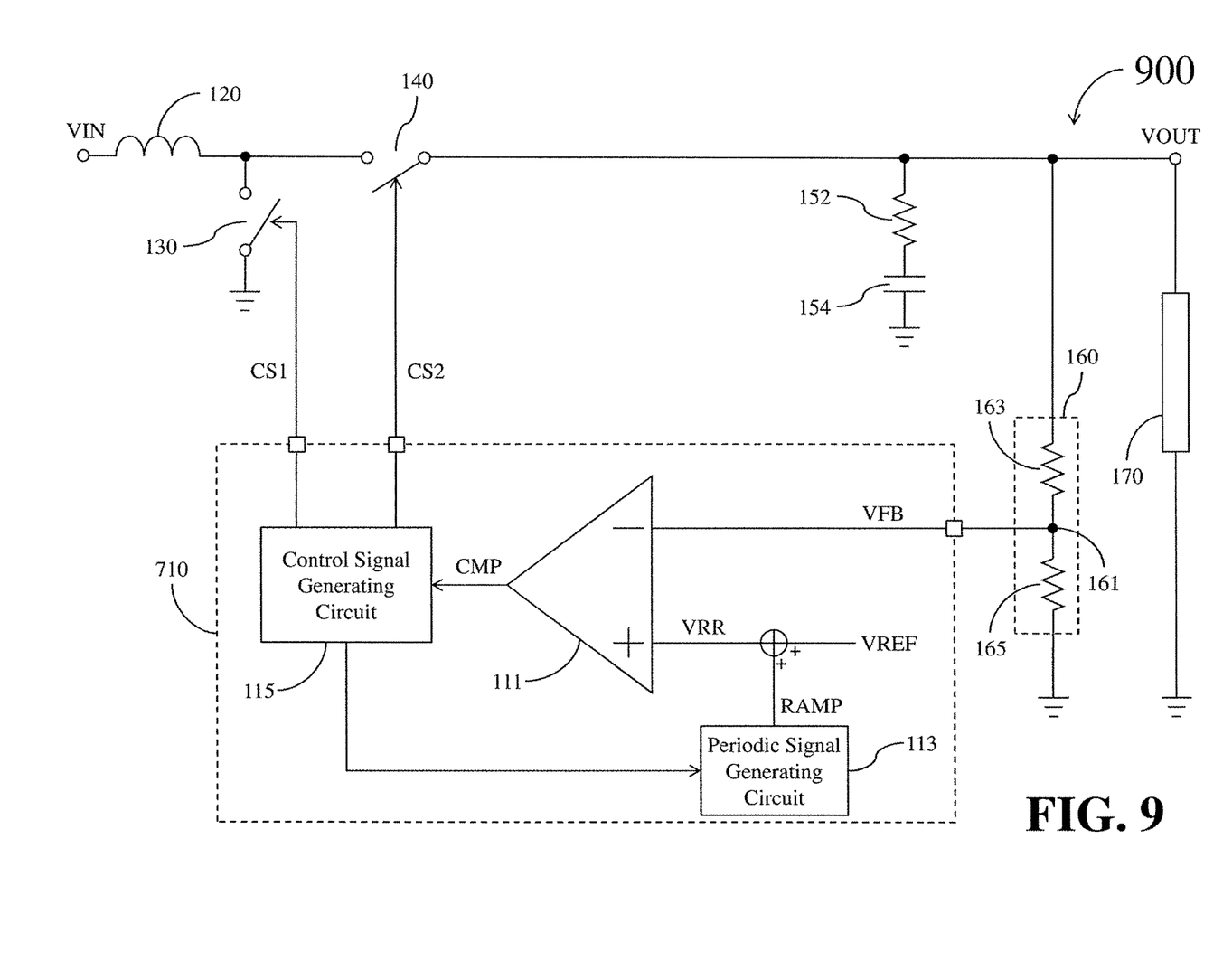

In another example, FIG. 9 shows a simplified functional block diagram of a power converter 900 according to another embodiment of the present disclosure. The power converter 900 comprises the control circuit 710, the inductor 120, the first power switch 130, the second power switch 140, the equivalent series resistor 152, the output capacitor 154, and the feedback circuit 160. As shown, the power converter 900 is also a synchronous-type boost power converter.

The structure of the power converter 900 is similar to the power converter 800 of FIG. 8. Accordingly, the foregoing descriptions regarding the connection relationships, implementations, and operations of the inductor 120, the first power switch 130, the second power switch 140, the equivalent series resistor 152, the output capacitor 154, and the feedback circuit 160 in the power converter 400 are also applicable to the corresponding components in the power converter 900.

The structure of the control circuit 710 of the power converter 900 is the same as the control circuit 710 in FIG. 7, and thus the foregoing descriptions regarding the implementations and operations of the control circuit 710 in FIG. 7 are also applicable to the embodiment of FIG. 9.

Additionally, in some embodiments, the second power switch 140 in the aforementioned power converter 800 or 900 may be replaced by a diode. That is, the disclosed control circuits 110 and 710 are also applicable to asynchronous-type boost power converters. In this situation, the control circuit 110 or 710 needs not to output the second control signal CS2, and thus the corresponding signal pin can be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit (110; 710) of a power converter (100; 700; 800; 900), the power converter (100; 700; 800; 900) comprising an inductor (120), a first power switch (130), and a feedback circuit (160), wherein the first power switch (130) is utilized for controlling the inductor (120) to store or release energy to convert an input signal (VIN) into an output signal (VOUT), and the feedback circuit (160) is utilized for generating a feedback signal (VFB) corresponding to a magnitude of the output signal (VOUT), the control circuit (110; 710) comprising:

a comparing circuit (111) comprising a first input terminal and a second input terminal and configured to operably generate a comparison signal (CMP) according to signals received by the first input terminal and the second input terminal, wherein the first input terminal is utilized for coupling with a reference signal (VREF) while the second input terminal is utilized for coupling with the feedback signal (VFB);

a periodic signal generating circuit (113), coupled with the comparing circuit (111), configured to operably generate a periodic signal (RAMP) and apply the periodic signal (RAMP) to the first input terminal or the second input terminal of the comparing circuit (111); and a control signal generating circuit (115), coupled with the comparing circuit (111), configured to operably control an on time of the first power switch (130) according to the comparison signal (CMP);

wherein the periodic signal generating circuit (113) is further configured to operably clamp a limit of the periodic signal (RAMP) to a predetermined value, but does not configure a slope of the periodic signal (RAMP) to be zero when there is no current passing through the inductor (120);

wherein the periodic signal generating circuit (113) comprises:

an internal signal generator (200), coupled with the control signal generating circuit (115), configured to operably generate a first internal signal (VR1);

an upper limit clamping circuit (240), coupled with the internal signal generator (200), configured to operably clamp an upper limit of the first internal signal (VR1) to a first predetermined value; and a lower limit clamping circuit (250), configured to operably clamp a lower limit of the first internal signal (VR1) to a second predetermined value smaller than the first predetermined value to form the periodic signal (RAMP);

wherein the control signal generating circuit (115) controls the internal signal generator (200) to reduce a magnitude of the first internal signal (VR1) to zero when turns on the first switch circuit (230).

2. The control circuit (110; 710) of claim 1, wherein the internal signal generator (200) comprises:

an internal node (201);

a capacitor (210), coupled between the internal node (201) and a fixed-voltage terminal;

a current source (220), coupled with the internal node (201), configured to operably generate and output a charging current (ICH) directly proportional to a switching frequency of the first power switch (130) to the internal node (201) to charge the capacitor (210), so as to render the internal node (201) to provide the first internal signal (VR1);

a first switch circuit (230), coupled between the internal node (201) and a fixed-voltage terminal while forming a parallel connection with the capacitor (210), wherein the first switch circuit (230) is controlled by the control signal generating circuit (115) and the control signal generating circuit (115) turns on the first switch circuit (230) when turns on the first power switch (130) to reduce the magnitude of the first internal signal (VR1) to zero.

3. The control circuit (110; 710) of claim 2, wherein the internal signal generator (200) further comprises:
a second switch circuit (420) coupled between the internal node (201) and the current source (220), and controlled by the control signal generating circuit (115); and
a current sink (430) coupled between the first switch circuit (230) and the fixed-voltage terminal, and controlled by the control signal generating circuit 115.

4. The control circuit (110; 710) of claim 3, wherein the first internal signal (VR1) at the internal node (201) gradually ramps down during the on time of the first power switch (130) and then gradually ramps up during an off time of the first power switch (130) in each cycle.

5. The control circuit (110; 710) of claim 4, wherein while the control signal generating circuit (115) turns on the first power switch (130), the control signal generating circuit (115) utilizes a first switch control signal (TR) to turn on the first switch circuit (230), and while the control signal generating circuit (115) turns off the first power switch (130), the control signal generating circuit (115) utilizes a second switch control signal (TS) to turn on the second switch circuit (420).

6. The control circuit (110; 710) of claim 3, wherein the first internal signal (VR1) at the internal node (201) gradually ramps down during a first half cycle and then ramps up during a second half cycle in each cycle.

7. The control circuit (110; 710) of claim 6, wherein when the control signal generating circuit (115) turns on the first power switch (130), the control signal generating circuit (115) first turns on the first switch circuit (230) and then turns off the first switch circuit (230) after a predetermined time length, and when the control signal generating circuit (115) turns off the first switch circuit (230), the control signal generating circuit (115) first turns on the second switch circuit (420) and then turns off the second switch circuit (420) after the predetermined time length.

8. A control circuit (110; 710) of a power converter (100; 700; 800; 900), the power converter (100; 700; 800; 900) comprising an inductor (120), a first power switch (130), and a feedback circuit (160), wherein the first power switch (130) is utilized for controlling the inductor (120) to store or release energy to convert an input signal (VIN) into an output signal (VOUT), and the feedback circuit (160) is utilized for generating a feedback signal (VFB) corresponding to a magnitude of the output signal (VOUT), the control circuit (110; 710) comprising:
a comparing circuit (111) comprising a first input terminal and a second input terminal and configured to operably generate a comparison signal (CMP) according to signals received by the first input terminal and the second input terminal, wherein the first input terminal is utilized for coupling with a reference signal (VREF) while the second input terminal is utilized for coupling with the feedback signal (VFB);
a periodic signal generating circuit (113), coupled with the comparing circuit (111), configured to operably generate a periodic signal (RAMP) and apply the periodic signal (RAMP) to the first input terminal or the second input terminal of the comparing circuit (111); and a control signal generating circuit (115), coupled with the comparing circuit (111), configured to operably control an on time of the first power switch (130) according to the comparison signal (CMP);
wherein the periodic signal generating circuit (113) is further configured to operably clamp a limit of the periodic signal (RAMP) to a predetermined value, but does not configure a slope of the periodic signal (RAMP) to be zero when there is no current passing through the inductor (120);
wherein the periodic signal generating circuit (113) comprises:
an internal signal generator (200), coupled with the control signal generating circuit (115), configured to operably generate a first internal signal (VR1); and
a clamping circuit (240; 250), coupled with the internal signal generator (200), configured to operably either clamp an upper limit of the first internal signal (VR1) to a first predetermined value to form the periodic signal (RAMP) or clamp a lower limit of the first internal signal (VR1) to a second predetermined value smaller than the first predetermined value to form the periodic signal (RAMP);
wherein the control signal generating circuit (115) controls the internal signal generator (200) to reduce a magnitude of the first internal signal (VR1) to zero when turns on the first switch circuit (230).

9. The control circuit (110; 710) of claim 8, wherein the internal signal generator (200) comprises:
an internal node (201);
a capacitor (210), coupled between the internal node (201) and a fixed-voltage terminal;
a current source (220), coupled with the internal node (201), configured to operably generate and output a charging current (ICH) directly proportional to a switching frequency of the first power switch (130) to the internal node (201) to charge the capacitor (210), so as to render the internal node (201) to provide the first internal signal (VR1);
a first switch circuit (230), coupled between the internal node (201) and a fixed-voltage terminal while forming a parallel connection with the capacitor (210), wherein the first switch circuit (230) is controlled by the control signal generating circuit (115) and the control signal generating circuit (115) turns on the first switch circuit (230) when turns on the first power switch (130) to reduce the magnitude of the first internal signal (VR1) to zero.

10. The control circuit (110; 710) of claim 9, wherein the periodic signal generating circuit (113) further comprises:
a second switch circuit (420) coupled between the internal node (201) and the current source (220), and controlled by the control signal generating circuit (115); and
a current sink (430) coupled between the first switch circuit (230) and the fixed-voltage terminal, and controlled by the control signal generating circuit 115.

11. The control circuit (110; 710) of claim 10, wherein the first internal signal (VR1) at the internal node (201) gradually ramps down during the on time of the first power switch (130) and then gradually ramps up during an off time of the first power switch (130) in each cycle.

12. The control circuit (110; 710) of claim 11, wherein while the control signal generating circuit (115) turns on the first power switch (130), the control signal generating circuit (115) utilizes a first switch control signal (TR) to turn on the first switch circuit (230), and while the control signal generating circuit (115) turns off the first power switch (130), the control signal generating circuit (115) utilizes a second switch control signal (TS) to turn on the second switch circuit (420).

13. The control circuit (110; 710) of claim 10, wherein the first internal signal (VR1) at the internal node (201) gradually ramps down during a first half cycle and then ramps up during a second half cycle in each cycle.

14. The control circuit (110; 710) of claim 13, wherein when the control signal generating circuit (115) turns on the first power switch (130), the control signal generating circuit (115) first turns on the first switch circuit (230) and then turns off the first switch circuit (230) after a predetermined time length, and when the control signal generating circuit (115) turns off the first switch circuit (230), the control signal generating circuit (115) first turns on the second switch circuit (420) and then turns off the second switch circuit (420) after the predetermined time length.

15. A method for controlling a first power switch (130) of a power converter (100; 700; 800; 900), the power converter (100; 700; 800; 900) comprising an inductor (120), the first power switch (130), and a feedback circuit (160), wherein the first power switch (130) is utilized for controlling the inductor (120) to store or release energy to convert an input signal (VIN) into an output signal (VOUT), and the feedback circuit (160) is utilized for generating a feedback signal (VFB) corresponding to a magnitude of the output signal (VOUT), the method comprising:
providing a comparing circuit (111), wherein a first input terminal of the comparing circuit (111) is coupled with a reference signal (VREF) while a second input terminal of the comparing circuit (111) is coupled with the feedback signal (VFB);
generating a periodic signal (RAMP) and clamping a limit of the periodic signal (RAMP) to a predetermined value without configuring a slope of the periodic signal (RAMP) to be zero when there is no current passing through the inductor (120);
applying the periodic signal (RAMP) to the first input terminal or the second input terminal of the comparing circuit (111);
utilizing the comparing circuit (111) to generate a comparison signal (CMP) according signals received by the first input terminal and the second input terminal; and
controlling an on time of the first power switch (130) according to the comparison signal (CMP);
wherein the operation for generating the periodic signal (RAMP) comprises:
generating a first internal signal (VR1);
clamping an upper limit of the first internal signal (VR1) to a first predetermined value;
clamping a lower limit of the first internal signal (VR1) to a second predetermined value smaller than the first predetermined value to form the periodic signal (RAMP); and
reducing a magnitude of the first internal signal (VR1) to zero when turns on the first power switch (130).

16. The method of claim 15, wherein the operation for generating the first internal signal (VR1) comprises:
providing a capacitor (210) coupled between an internal node (201) and a fixed-voltage terminal; and
generating and outputting a charging current (ICH) directly proportional to a switching frequency of the first power switch (130) to the internal node (201) to charge the capacitor (210), so as to render the internal node (201) to provide the first internal signal (VR1).

17. The method of claim 16, wherein the operation for generating the first internal signal (VR1) comprises:
gradually decreasing the first internal signal (VR1) during the on time of the first power switch (130) and then gradually increasing the first internal signal (VR1) during an off time of the first power switch (130) in each cycle.

18. The method of claim 17, wherein the operation for generating the first internal signal (VR1) further comprises:
while turning on the first power switch (130), sinking a predetermined amount of current from the internal node (201) and stopping outputting the charging current (ICH) to the internal node (201); and
while turning off the first power switch (130), outputting the charging current (ICH) to the internal node (201) and stopping sinking current from the internal node (201).

19. The method of claim 16, wherein the operation for generating the first internal signal (VR1) comprises:
gradually decreasing the first internal signal (VR1) during a first half cycle and then gradually increasing the first internal signal (VR1) during a second half cycle in each cycle.

20. The method of claim 19, wherein the operation for generating the first internal signal (VR1) further comprises:
when turning on the first power switch (130), sinking a predetermined amount of current from the internal node (201) for a predetermined time length and then stopping sinking current from the internal node (201); and
when turning off the first power switch (130), outputting the charging current (ICH) to the internal node (201) for the predetermined time length and then stopping outputting the charging current (ICH) to the internal node (201).

21. A method for controlling a first power switch (130) of a power converter (100; 700; 800; 900), the power converter (100; 700; 800; 900) comprising an inductor (120), the first power switch (130), and a feedback circuit (160), wherein the first power switch (130) is utilized for controlling the inductor (120) to store or release energy to convert an input signal (VIN) into an output signal (VOUT), and the feedback circuit (160) is utilized for generating a feedback signal (VFB) corresponding to a magnitude of the output signal (VOUT), the method comprising:
providing a comparing circuit (111), wherein a first input terminal of the comparing circuit (111) is coupled with a reference signal (VREF) while a second input terminal of the comparing circuit (111) is coupled with the feedback signal (VFB);
generating a periodic signal (RAMP) and clamping a limit of the periodic signal (RAMP) to a predetermined value without configuring a slope of the periodic signal (RAMP) to be zero when there is no current passing through the inductor (120);
applying the periodic signal (RAMP) to the first input terminal or the second input terminal of the comparing circuit (111);
utilizing the comparing circuit (111) to generate a comparison signal (CMP) according signals received by the first input terminal and the second input terminal; and
controlling an on time of the first power switch (130) according to the comparison signal (CMP);
wherein the operation for generating the periodic signal (RAMP) further comprises:
generating a first internal signal (VR1);
clamping an upper limit of the first internal signal (VR) to a first predetermined value or clamping a lower limit of the first internal signal (VR1) to a second predetermined value smaller than the first predetermined value to form the periodic signal (RAMP); and reducing a magnitude of the first internal signal (VR1) to zero when turns on the first power switch (130).

22. The method of claim 21, wherein the operation for generating the first internal signal (VR1) further comprises:
providing a capacitor (210) coupled between an internal node (201) and a fixed-voltage terminal; and
generating and outputting a charging current (ICH) directly proportional to a switching frequency of the first power switch (130) to the internal node (201) to charge the capacitor (210), so as to render the internal node (201) to provide the first internal signal (VR1).

23. The method of claim 22, wherein the operation for generating the first internal signal (VR1) comprises:
gradually decreasing the first internal signal (VR1) during the on time of the first power switch (130) and then gradually increasing the first internal signal (VR1) during an off time of the first power switch (130) in each cycle.

24. The method of claim 23, wherein the operation for generating the first internal signal (VR1) further comprises:
while turning on the first power switch (130), sinking a predetermined amount of current from the internal node (201) and stopping outputting the charging current (ICH) to the internal node (201); and
while turning off the first power switch (130), outputting the charging current (ICH) to the internal node (201) and stopping sinking current from the internal node (201).

25. The method of claim 22, wherein the operation for generating the first internal signal (VR1) comprises:
gradually decreasing the first internal signal (VR1) during a first half cycle and then gradually increasing the first internal signal (VR1) during a second half cycle in each cycle.

26. The method of claim 25, wherein the operation for generating the first internal signal (VR1) further comprises:
when turning on the first power switch (130), sinking a predetermined amount of current from the internal node (201) for a predetermined time length and then stopping sinking current from the internal node (201); and
when turning off the first power switch (130), outputting the charging current (ICH) to the internal node (201) for the predetermined time length and then stopping outputting the charging current (ICH) to the internal node (201).

* * * * *